US012316543B2

(12) United States Patent
Goliya et al.

(10) Patent No.: US 12,316,543 B2
(45) Date of Patent: May 27, 2025

(54) HANDLING VIRTUAL MACHINE MIGRATION IN A COMPUTING SYSTEM WITH MULTI-SITE STRETCHED GATEWAYS

(71) Applicant: VMware, Inc., Palo Alto, CA (US)

(72) Inventors: Abhishek Goliya, Pune (IN); Santosh Pallagatti Kotrabasappa, Bangalore (IN)

(73) Assignee: VMware LLC, Palo Alto, CA (US)

( * ) Notice: Subject to any disclaimer, the term of this patent is extended or adjusted under 35 U.S.C. 154(b) by 431 days.

(21) Appl. No.: 17/959,989

(22) Filed: Oct. 4, 2022

(65) Prior Publication Data

US 2024/0113971 A1 Apr. 4, 2024

(51) Int. Cl.
*H04L 45/76* (2022.01)
*H04L 45/02* (2022.01)

(52) U.S. Cl.
CPC ............ *H04L 45/76* (2022.05); *H04L 45/02* (2013.01)

(58) Field of Classification Search
CPC ............................... H04L 45/76; H04L 45/02
USPC ........................................................ 370/389
See application file for complete search history.

(56) References Cited

U.S. PATENT DOCUMENTS

| 9,348,646 | B1* | 5/2016 | Daya ................... G06F 9/4856 |
| 10,419,340 | B2 | 9/2019 | Wu et al. |
| 10,904,148 | B2* | 1/2021 | Jain ................... G06F 9/45558 |
| 11,233,824 | B2 | 1/2022 | Zhu et al. |
| 2018/0063000 | A1* | 3/2018 | Wu .................... H04L 61/5007 |
| 2019/0280979 | A1* | 9/2019 | Jain .................. H04L 61/2546 |
| 2020/0403922 | A1* | 12/2020 | Yu ........................ H04L 45/586 |
| 2021/0314232 | A1* | 10/2021 | Nainar .................. H04L 45/64 |
| 2021/0314358 | A1* | 10/2021 | Zhu ........................ H04L 47/20 |
| 2024/0113971 | A1* | 4/2024 | Goliya .................... H04L 45/02 |

FOREIGN PATENT DOCUMENTS

WO WO-2013158920 A1 * 10/2013 ......... G06F 9/45558

* cited by examiner

*Primary Examiner* — Anthony Mejia
(74) *Attorney, Agent, or Firm* — Kim & Stewart LLP (57) ABSTRACT

An example method of handling traffic for an existing connection of a virtual machine (VM) migrated from a source site to a destination site includes: receiving, at an edge server of the destination site, the traffic, the traffic being associated with a network flow; determining, by the edge server of the destination site, that a stateful service of the edge server does not have state for the network flow; sending, by the edge server of the destination site, a threshold number of packets of the traffic to a plurality of sites; receiving, at the edge server of the destination site, an acknowledgement from the source site that the source site has the state for the network flow; and creating, by the edge server of the destination site, a flow mapping to send the traffic associated with the network flow to the source site.

20 Claims, 7 Drawing Sheets

HANDLING VIRTUAL MACHINE MIGRATION IN A COMPUTING SYSTEM WITH MULTI-SITE STRETCHED GATEWAYS

BACKGROUND

Applications today are deployed onto a combination of virtual machines (VMs), containers, application services, and more within a software-defined datacenter (SDDC). The SDDC includes a server virtualization layer having clusters of physical servers that are virtualized and managed by virtualization management servers. Each host includes a virtualization layer (e.g., a hypervisor) that provides a software abstraction of a physical server (e.g., central processing unit (CPU), random access memory (RAM), storage, network interface card (NIC), etc.) to the VMs. Hosts can be organized into clusters ("host clusters") and managed by a virtualization management server. The virtualization management server treats host clusters as pools of compute capacity for use by virtual machines and namespace containers.

The SDDC may implement one or more software defined networks (SDNs) which are logical overlay networks having address spaces that are decoupled from the underlying physical network infrastructure. The overlay networks are implemented by managed forwarding devices on hosts, as well as physical routers and other components. Separation between the overlay and underlay networks may be realized by encapsulating overlay network packets for transport across the underlay network. The overlay network is a "logical network" in the sense that it, including logical switches and logical routers, exists only in software and in the forwarding tables of the physical managed forwarding devices.

The software defined network may also be supported by edge service gateways (ESGs) that facilitate communication between overlay networks on which workload VMs reside and physical networks, including wide area networks (WANs), such as the public Internet. The ESGs may provide various gateway services to the software defined logical overlay networks, such as network address translation (NAT), firewall (FW), virtual private network (VPN), domain name service (DNS), and the like services.

Multi-site SDDCs can include data centers distributed across multiple sites (e.g., geographically separate sites). Gateways and networks, such as the ESGs, can be stretched between multiple sites using layer 2 (L2) stretching. L2 stretching allows a VM to migrate from one site to another while maintain IP address(es) and media access control (MAC) address(es) of its network interfaces. ESGs may apply stateful services to egress/ingress traffic (e.g., firewall, network address translation (NAT), and the like services). After a VM is migrated to a destination site, new network connections to the VM function as desired with the ESG in the destination site applying stateful services to the connection. Existing connections to the VM, however, are broken since the state for the existing connections remains on the ESG of the source site. The ESG in the destination site does not have state associated with the existing connections and drops the packets. It is desirable to maintain existing connections for migrated VMs in a multi-site system with stretched gateways/networks.

SUMMARY

In an embodiment, \a method of handling traffic for an existing connection of a virtual machine (VM) migrated from a source site to a destination site includes: receiving, at an edge server of the destination site, the traffic, the traffic being associated with a network flow; determining, by the edge server of the destination site, that a stateful service of the edge server does not have state for the network flow; sending, by the edge server of the destination site, a threshold number of packets of the traffic to a plurality of sites; receiving, at the edge server of the destination site, an acknowledgement from the source site that the source site has the state for the network flow; and creating, by the edge server of the destination site, a flow mapping to send the traffic associated with the network flow to the source site.

Further embodiments include a non-transitory computer-readable storage medium comprising instructions that cause a computer system to carry out the above method, as well as a computer system configured to carry out the above method.

DETAILED DESCRIPTION

Figure 1:
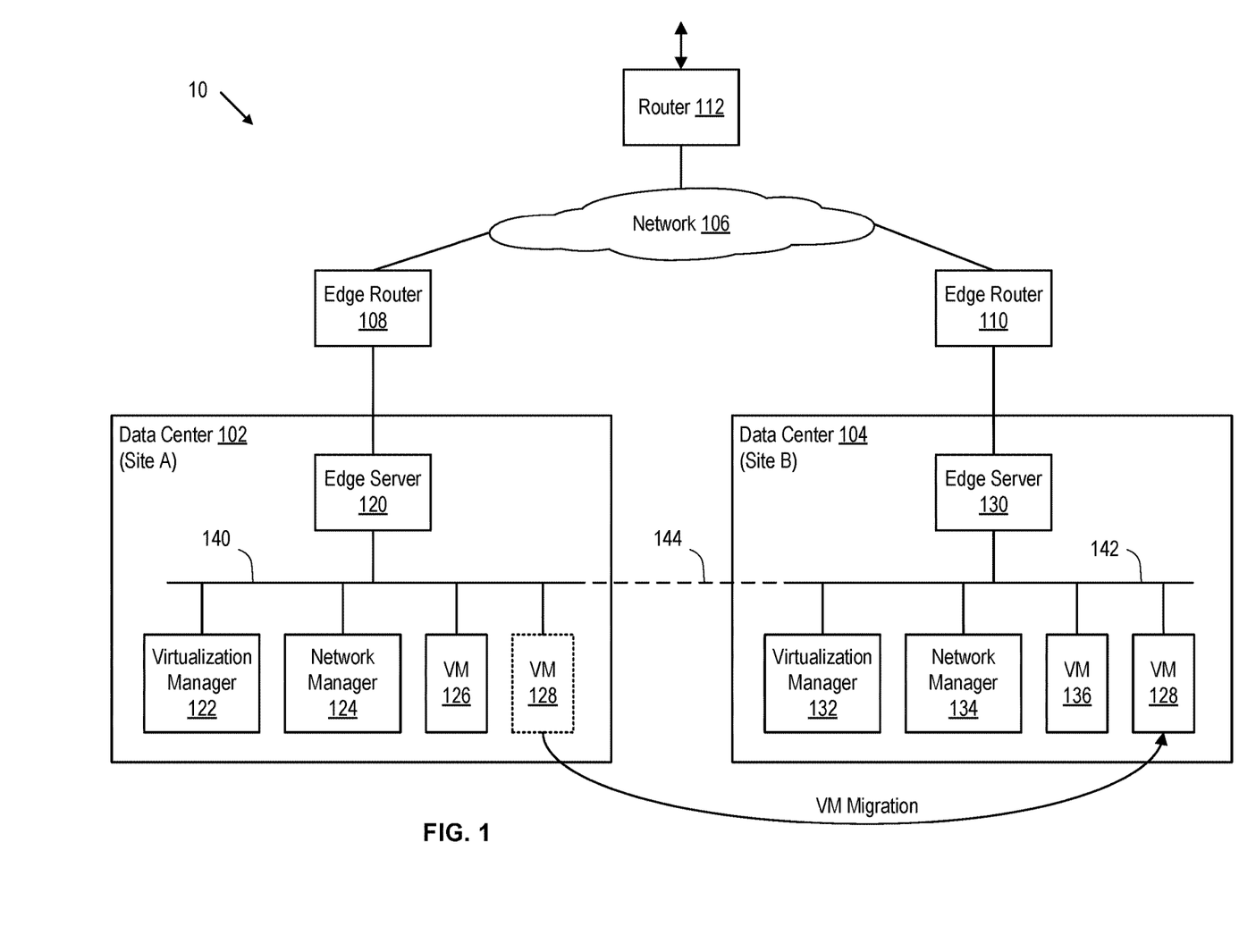
FIG. 1 is a block diagram depicting a computing system according to embodiments.

FIG. 1 is a block diagram depicting a computing system 10 according to embodiments. Computing system 10 comprises a multi-site system having a data center 102 ("site A") and a data center 104 ("site B"). Data center 102 receives data ingress traffic from, and sends egress traffic to, edge router 108. Egress traffic is also referred to as "north traffic" and ingress traffic is also referred to as "south traffic." Traffic comprises packets, such as Internet Protocol (IP) packets, having a source and destination. Data center 104 receives ingress traffic from, and sends egress traffic to, edge router 110. Edge routers 108 and 110 are connected to a network 106, such as a wide area network (WAN) (e.g., a corporate network). Edge routers 108 and 110 can communicate with router 112 through network 106 to send/receive north/south traffic from other networks (e.g., the public Internet). In embodiments, sites A and B are geographically separate, e.g., site A in London and site B in Paris. In embodiments, edge routers 108 and 110, network 106, and router 112 can be deployed in a public cloud.

Data center 102 includes an edge server 120, virtualization manager 122, network manager 124, and a plurality of virtual machines (VMs), e.g., VMs 126 and 128, connected by a network 140. Virtualization manager 122 executes on physical server(s) or virtual machine(s) to manage VMs 126 and 128 as well as the host computers on which VMs 128 and 128 execute (shown in FIG. 2). Network manager 124 executes on physical server(s) or virtual machine(s) to orchestrate networking in data center 102, including a software-defined network (SDN). An SDN may comprise a control plane comprising one or more controllers and a data plane that comprises a set of overlay networks and one or more underlay (i.e., physical) networks. The controller(s) may reside on virtual machine(s) and deploy logical overlay networks on which virtual machines or other virtualized endpoints may reside by instantiating and configuring virtual switches, virtual distributed routers, tunnel endpoints, and other components implemented in software and in conjunction with hypervisors executing on each host (shown in FIG. 2). Network manager 124 is configured to deploy and manage the controller(s) and/or data plane of the SDN network. Edge server 120 executes on physical server(s) or virtual machine(s) to provide an edge service gateway (ESG) between network 140 and external network(s). Edge server 120 communicates north/south traffic to/from edge router 108.

Data center 104 includes an edge server 130, virtualization manager 132, network manager 134, and a plurality of VMs, e.g., VMs 136 and 128, connected by a network 142. Virtualization manager 132 and network manager 134 function as described above for virtualization manager 122 and network manager 124, respectively. Edge server 130 executes on physical server(s) or virtual machine(s) to provide an interface between network 142 and external network(s). Edge server 130 communicates north/south traffic to/from edge router 110.

In embodiments, network manager 124 cooperates with network manager 134 (or an external network manager cooperates with network managers 124/134) to deploy a stretched network 144 between data center 102 and 104. Stretched network 144 allows VMs executing in data center 102 to be part of the same layer 2 (L2) broadcast domain as VMs executing in data center 104. Stretched network 144 may be referred to as a stretched L2 network. Stretched network 144 can include stretched gateways (gateways in different sites sharing the same router span) and stretched logical networks (logical networks in different sites sharing the same broadcast domain). In embodiments, a VM in data center 102 can be migrated to data center 104 (or vice versa). In the example shown in FIG. 1, VM 128 in data center 102 is migrated to data center 104. Since VM 128 is connected to stretched network 144, VM 128 can retain the internet protocol (IP) and media access control (MAC) address(es) on its network interface(s).

Before migration, VM 128 can establish connections with external entities, such as transmission control protocol (TCP) connections or the like. Each connection includes a start and an end and can be described by a network flow. A network flow includes a tuple of information describing the connection, such as source IP address, destination IP address, source port, destination port, and the protocol in use. Before migration, VM 128 can have existing connections (e.g., connections that have not ended). The existing connections resume after VM 128 is migrated to data center 104. In order for edge server 130 to receive traffic destined for VM 128 that has been migrated, edge server 130 can advertise a specific route to edge router 110 for VM 128 (an x.x.x.x/32 route). For example, VM 128 can have an IP address 10.10.10.1 on a 10.10.10.0/24 network. After migration, edge server 130 can advertise a 10.10.10.1/32 route for VM 128 to edge router 110 in order to attract traffic for VM 128. This can avoid ingress traffic for VM 128 being routed instead to edge server 120 in data center 102 from which VM 128 was migrated.

If stateful service(s) is/are applied to an existing connection of VM 128, such state is maintained by edge server 120, since VM 128 opened the connection prior to migration. Stateful services include, for example, firewalls, source network address translation (SNAT), destination network address translation (DNAT), and the like. After VM 128 is migrated, state for existing connections (if any) remains in edge server 120 as managed by stateful service(s) thereof. Thus, after migration, even if the specific route to VM 128 is advertised to edge router 110, stateful service(s) will not be applied fully by edge server 130 (since state is in edge server 120) and some or all of the existing connections will break. Note that new connections by VM 128 after migration have stateful service(s) applied by edge server 130. Thus, the problem only impacts the existing connections that had stateful service(s) applied by edge server 120 prior to migration.

Consider the following example. Assume a case where stateful firewall services are applied by edge server 120 in data center 102 and that VM 128 has existing connections for which the stateful firewall services are applied. VM 128 is then migrated from data center 102 to data center 104 and edge server 130 advertises a specific route for VM 128 (e.g., a 10.10.10.1/32 route for VM 128 having an IP address 10.10.10.1). Edge server 130 will attract traffic for VM 128 for both new and existing connections. For new connections, there is no issue as stateful firewall services are applied by edge server 130. For existing connections, when packets arrive at edge server 130 for VM 128, edge server 130 will drop the packets as there is no associated state for receiving the packets.

Consider another example. Assume a case where NAT services are applied by edge server 120 in data center 102 and that VM 128 has existing connections for which the NAT services are applied. In this case, after migration of VM 128 to data center 104, traffic destined for VM 128 is still attracted to edge server 120 for all existing connections due to the NAT services (i.e., the destination IP for the traffic is the DNAT IP address of edge server 120). In such case, the traffic at edge server 120 arrives at an L2 forwarder (shown below), which determines that VM 128 has been migrated and is now reachable in data center 104. Edge server 120 sends the traffic to edge server 130 and the traffic eventually reaches VM 128. Edge server 120 eventually receives return traffic from VM 128 and applies stateful firewall services. However, due to the nonexistence of state for the existing connection in edge server 130, the return traffic is dropped.

Accordingly, techniques are described herein to maintain existing connections for a VM migrated from one site to another. The techniques include two aspects: First, the control plane of network manager 124 includes functionality for analyzing routing configuration and auto-programming routes for local migrated VMs (e.g., advertising specific routes upstream. Second, the edge server is configured to discover the location of stateful services applied to existing connections of a migrated VM. Existing connections of a VM may have egress via site A but the VM may be later migrated to site B. Although the VM is now located in site B, existing connections shall still egress/ingress via site A. New connections for the VM shall ingress/egress directly via site B.

Figure 2:
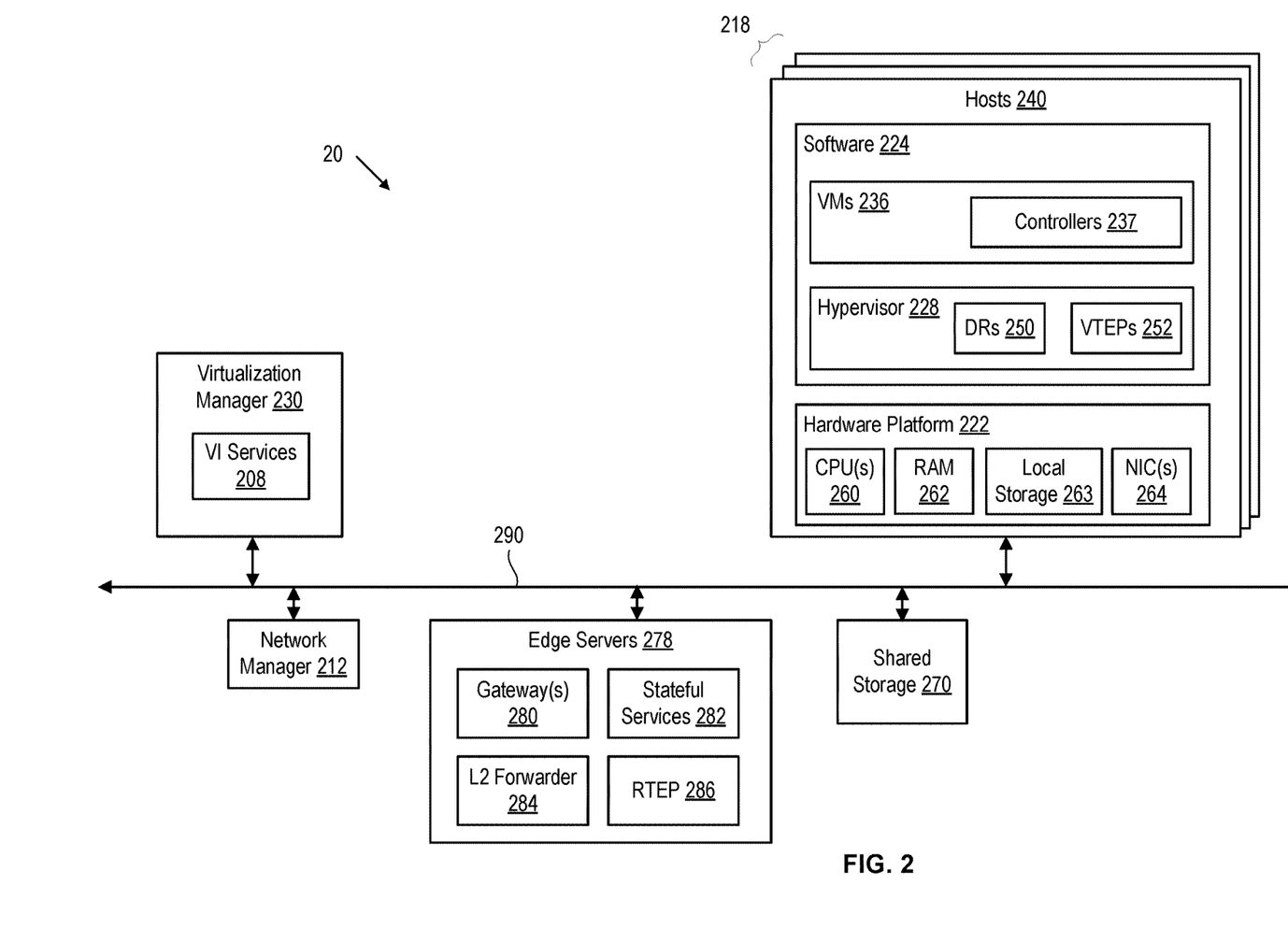
FIG. 2 is a block diagram of a data center in which embodiments described herein may be implemented.

FIG. 2 is a block diagram of a data center 20 in which embodiments described herein may be implemented. Each of data center 102 and 104 in FIG. 1 can be implemented as shown by data center 20. Data center 20 includes a cluster of hosts 240 ("host cluster 218") that may be constructed on hardware platforms such as an x86 architecture platforms.

For purposes of clarity, only one host cluster 218 is shown. However, data center 20 can include many of such host clusters 218. As shown, a hardware platform 222 of each host 240 includes conventional components of a computing device, such as one or more central processing units (CPUs) 260, system memory (e.g., random access memory (RAM) 262), one or more network interface controllers (NICs) 264, and optionally local storage 263. CPUs 260 are configured to execute instructions, for example, executable instructions that perform one or more operations described herein, which may be stored in RAM 262. NICs 264 enable host 240 to communicate with other devices through a physical network 290. Physical network 290 enables communication between hosts 240 and between other components and hosts 240 (other components discussed further herein).

In the embodiment illustrated in FIG. 2, hosts 240 access shared storage 270 by using NICs 264 to connect to network 280. In another embodiment (not shown) each host 240 contains a host bus adapter (HBA) through which input/output operations (IOs) are sent to shared storage 270 over a separate network (e.g., a fibre channel (FC) network). Shared storage 270 include one or more storage arrays, such as a storage area network (SAN), network attached storage (NAS), or the like. Shared storage 270 may comprise magnetic disks, solid-state disks, flash memory, and the like as well as combinations thereof. In some embodiments, hosts 240 include local storage 263 (e.g., hard disk drives, solid-state drives, etc.). Local storage 263 in each host 240 can be aggregated and provisioned as part of a virtual SAN, which is another form of shared storage 270.

Software 224 of each host 240 provides a virtualization layer, referred to herein as a hypervisor 228, which directly executes on hardware platform 222. In an embodiment, there is no intervening software, such as a host operating system (OS), between hypervisor 228 and hardware platform 222. Thus, hypervisor 228 is a. Type-1 hypervisor (also known as a "bare-metal" hypervisor). As a result, the virtualization layer in host cluster 218 (collectively hypervisors 228) is a bare-metal virtualization layer executing directly on host hardware platforms. Hypervisor 228 abstracts processor, memory, storage, and network resources of hardware platform 222 to provide a virtual machine execution space within which multiple virtual machines (VM) 236 may be concurrently instantiated and executed.

Virtualization manager 230 is a physical or virtual server that manages host cluster 218 and the virtualization layer therein. Virtualization manager 230 uses agent(s) (not shown) in hypervisor 228 so that host 240 can be managed by virtualization manager 230. Virtualization manager 230 logically groups hosts 240 into host Cluster 218 to provide cluster-level functions to hosts 240, such as VM migration between hosts 240 (e.g., for load balancing), distributed power management, and high-availability. The number of hosts 240 in host cluster 218 may be one or many. Virtualization manager 230 can manage more than one host cluster 218. Virtualization manager 230 can include various VI services 208. VI services 208 include various virtualization management services, such as a distributed resource scheduler (DRS), high-availability (HA) service, single sign-on (SSO) service, virtualization management daemon, and the like.

Network manager 212 is a physical or virtual server that orchestrates an SDN. In an embodiment, network manager 212 comprises one or more virtual servers deployed as VMs which may be placed on hosts 240 or elsewhere in data center 20. Network manager 212 operates in conjunction with additional agents in hypervisor 228 to manage host 240.

Network manager 212 deploys controllers 237 as VMs 236 to provide the control plane functions of the SDN. Hypervisor 228 includes data plane functions of the SDN, including distributed routers 250 and virtual tunnel endpoints (VTEPs) 252. Distributed routers 250 provide layer 3 (L3) routing between logical networks. VTEPs 252 encapsulate/decapsulate traffic on the overlay network using a L2-over-L3 encapsulation protocol such as VXLAN, GENEVE, or the like. Edge servers 278 include gateway(s) 280, stateful services 282, L2 forwarder 284, and a remote tunnel endpoint (RTEP) 286. Gateway(s) 280 provides L3 routing for data center 20 and include an ESG (and optionally lower tier gateway(s)). Stateful services 282 maintain state for network flows (e.g., firewall services, NAT services, etc.). RTEP 286 supports stretched networking between edge servers 278. Edge servers in different sites establish L2-over-L3 tunnels between RTEPs. L2 forwarder 284 forwards decapsulated traffic from RTEP 286 to the destinations in host cluster 218 and from sources in host cluster 218 to destination RTEPs.

Figure 3:
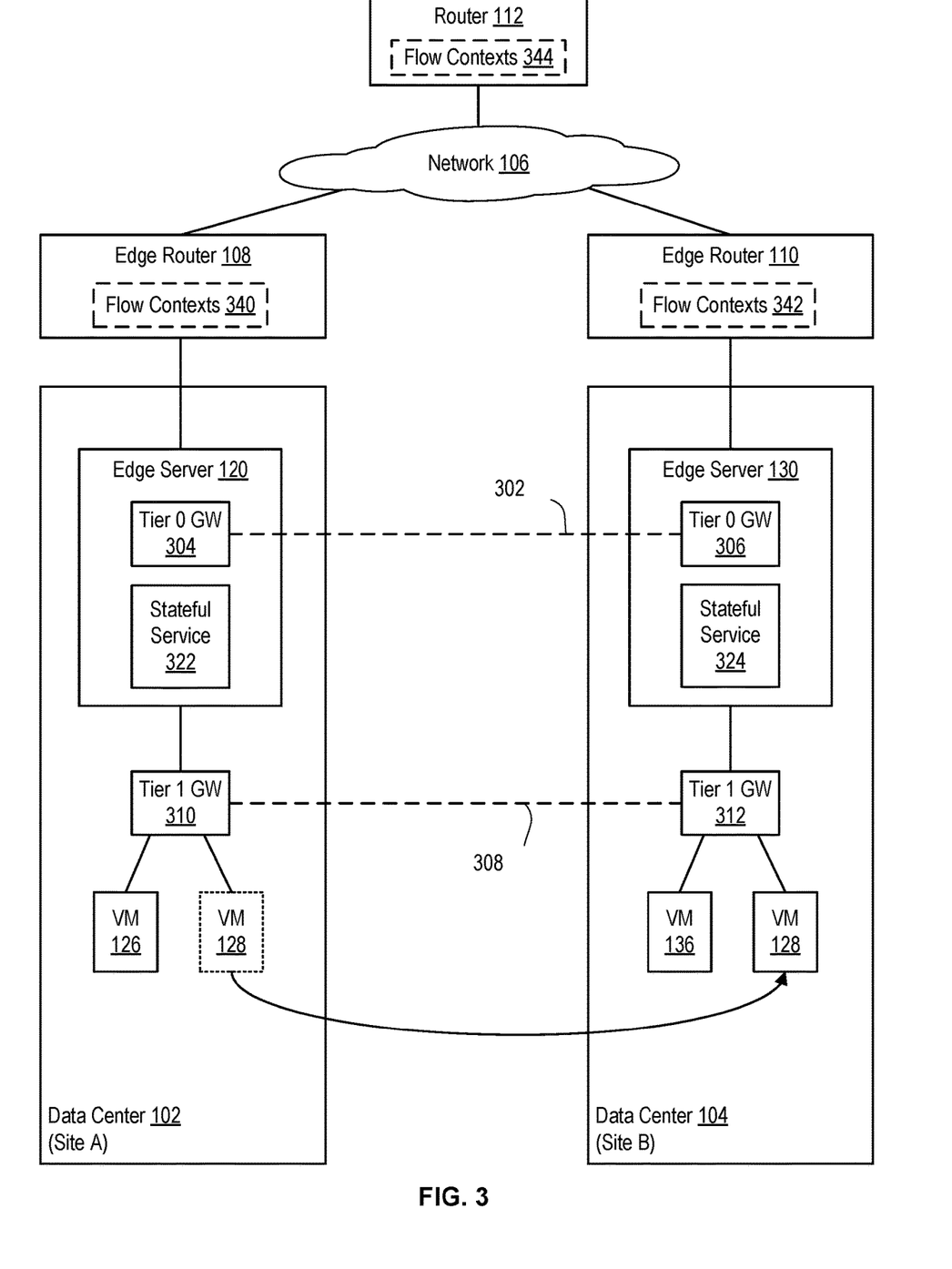
FIG. 3 is a block diagram depicting a logical view of data center according to embodiments.

FIG. 3 is a block diagram depicting a logical view of data center 10 according to embodiments. In the embodiment, the SDN includes a two-tier network topology, i.e., tier 1 and tier 0. At tier 1, gateways provide L3 routing for VMs connected to logical networks. In the embodiment, data center 102 includes a tier 1 gateway 310 servicing VMs 126 and 128 (prior to migration). Tier 1 gateway 310 can be implemented using distributed router 250 or can be implemented in edge server 120. Data center 104 includes a tier 1 gateway 312 servicing VMs 136 and 128 (after migration). Tier 1 is stretched between data centers 102 and 104 ("stretched tier 1 router span 308"). At tier 0, ESGs provide L3 routing for the data centers. In the embodiment, edge server 120 in data center 102 includes a tier 0 gateway 304. Edge server 130 in data center 104 includes a tier 0 gateway 306. Tier 0 is stretched between data centers 102 and 104 ("stretched tier 0 router span 302"). Edge server 120 includes a stateful service 322 and edge server 130 includes a stateful service 324. Stateful service 322 maintains state of network flows as discussed further in the methods below.

Figure 4:
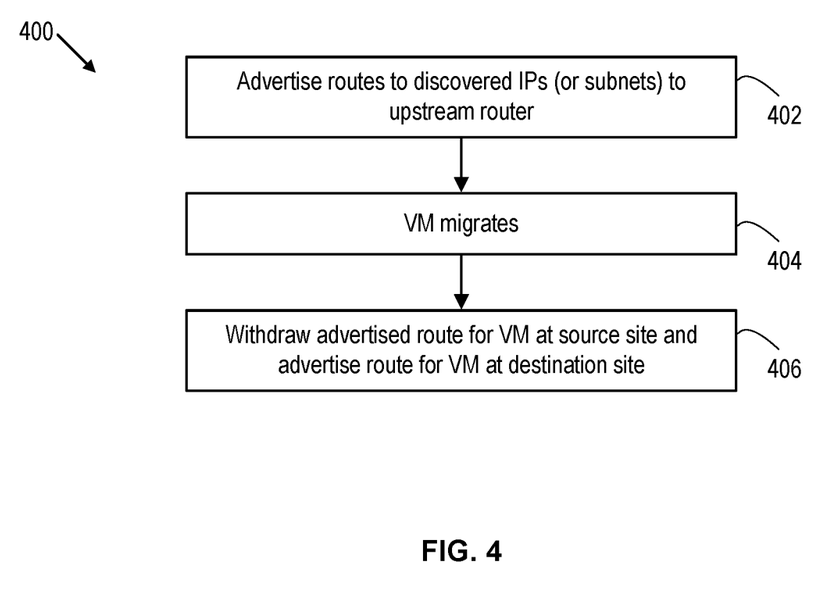
FIG. 4 is a flow diagram depicting a method of attracting ingress traffic for a VM post-migration according to embodiments.

FIG. 4 is a flow diagram depicting a method 400 of attracting ingress traffic for a VM post-migration according to embodiments. Method 400 begins at step 402, where tier-0 gateway 304 advertises routes of discovered IPs (or subnets) to edge router 108. In embodiments, controllers 237 discover IP/MAC bindings for all logical ports in the data center. Given a tier 1 segment (logical network), controllers 237 can configure tier 0 gateway to advertise only the discovered IP addresses on this segment rather than the entire subnet. In embodiments, controllers 237 can advertise the entire subnet of a tier 1 segment if a majority of VMs on the segment are located at that site. Step 402 is performed by the edge server in each of the sites.

At step 404, a VM is migrated from one site to another. In the embodiment of FIG. 3, VM 128 is migrated from data center 102 to data center 104. The migrated VM maintains the IP address(es) and MAC address(es) of its interfaces. At step 406, edge server 120 in data center 102 (source site) withdraws the advertised route for the VM and edge server 130 in data center 104 (destination site) advertises a specific route for the VM (an x.x.x.x/32 route). By doing so, ingress traffic for VM is attracted to data center 104 instead of data center 102 from which it migrated.

Figure 5:
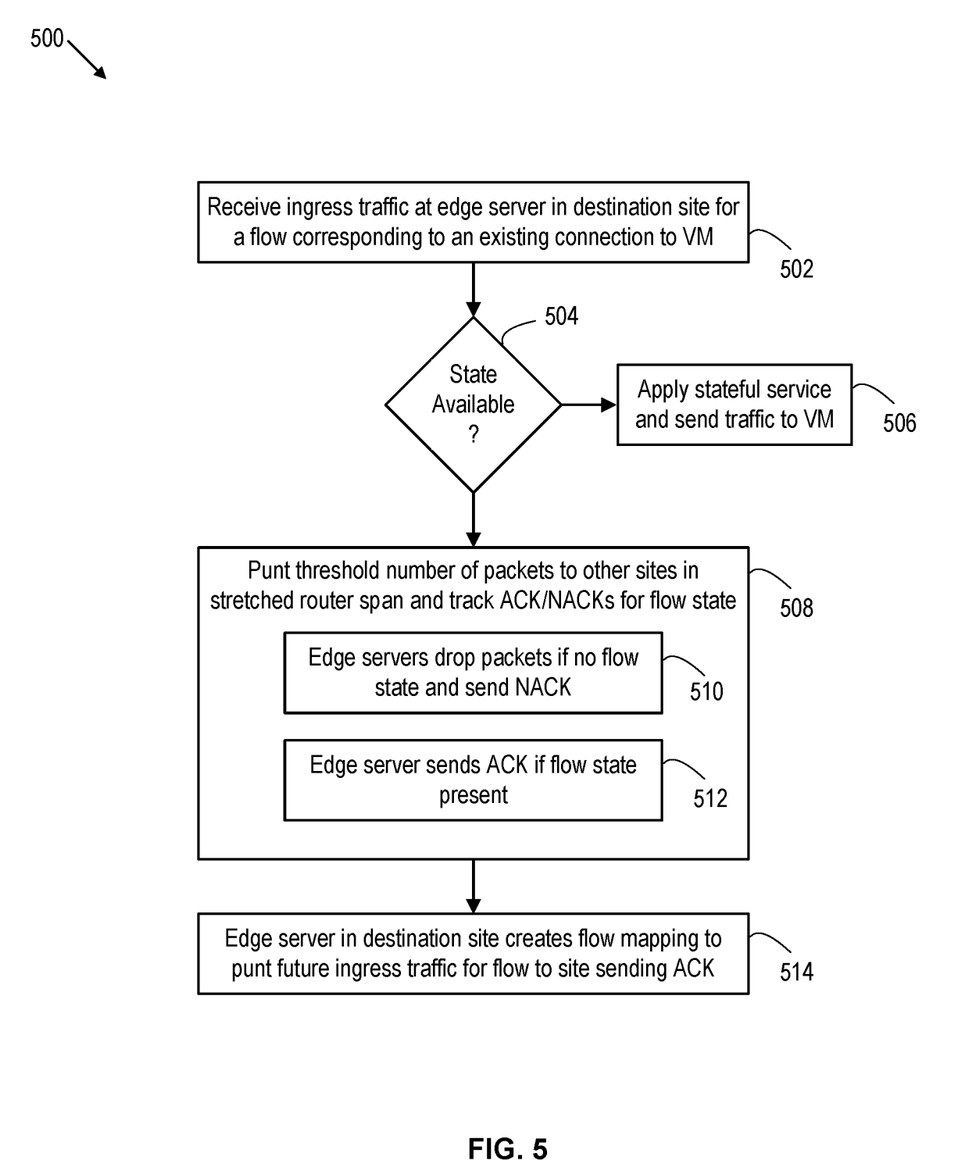
FIG. 5 is a flow diagram depicting a method of handling ingress traffic for a migrated VM according to an embodiment.

FIG. 5 is a flow diagram depicting a method 500 of handling ingress traffic for a migrated VM according to an embodiment. Method 500 begins at step 502, where edge server 130 receives ingress traffic for a flow corresponding to an existing connection to VM 128. At step 504, tier 0 gateway 306 in edge server 130 determines whether there is state available for the flow. Notably, if the existing connection was established prior to migration of the VM, then the state for the flow is located in the source site (e.g., stateful service 322 in edge server 120). If the existing connection was established after migration of the VM, then the state for the flow is located in the destination site (e.g., stateful service 324 in edge server 130). That is, new connections to or made by VM have state for their flows maintained by stateful service 324. When VM 128 was executing in data center 102, connections to or made by VM had state for their flows maintained by stateful service 322.

If at step 504 state is available, method 500 proceeds to step 506, where stateful service 324 applies state to the flow and sends the traffic to VM 128. If at step 504 state is unavailable, method 500 proceeds instead to step 508. At step 508, tier 0 gateway 306 punts a threshold number of packets from the flow to other sites in stretched router span 302. Tier 0 gateway 306 tracks acknowledgments (ACKs) and non-acknowledgements (NACKs) for the flow state by the other sites. Notably, at step 510, edge servers drop the punted packets if no flow state exists for the flow and sends NACKs to tier 0 gateway 306. At step 512, edge server 120 sends an ACK since it has flow state present. Punting involves encapsulating the packets using an L2-over-L3 protocol and sending the packets from the RTEP of edge server 130 to the RTEP of edge server 120. The encapsulated packets are tagged with a virtual network interface (VNI) of tier 0 gateway 304.

At step 514, edge server 130 creates a flow mapping to punt future ingress traffic for the flow to edge server 120. In this manner, existing connections of VM 128 continue to function after VM 128 is migrated.

Figure 6:
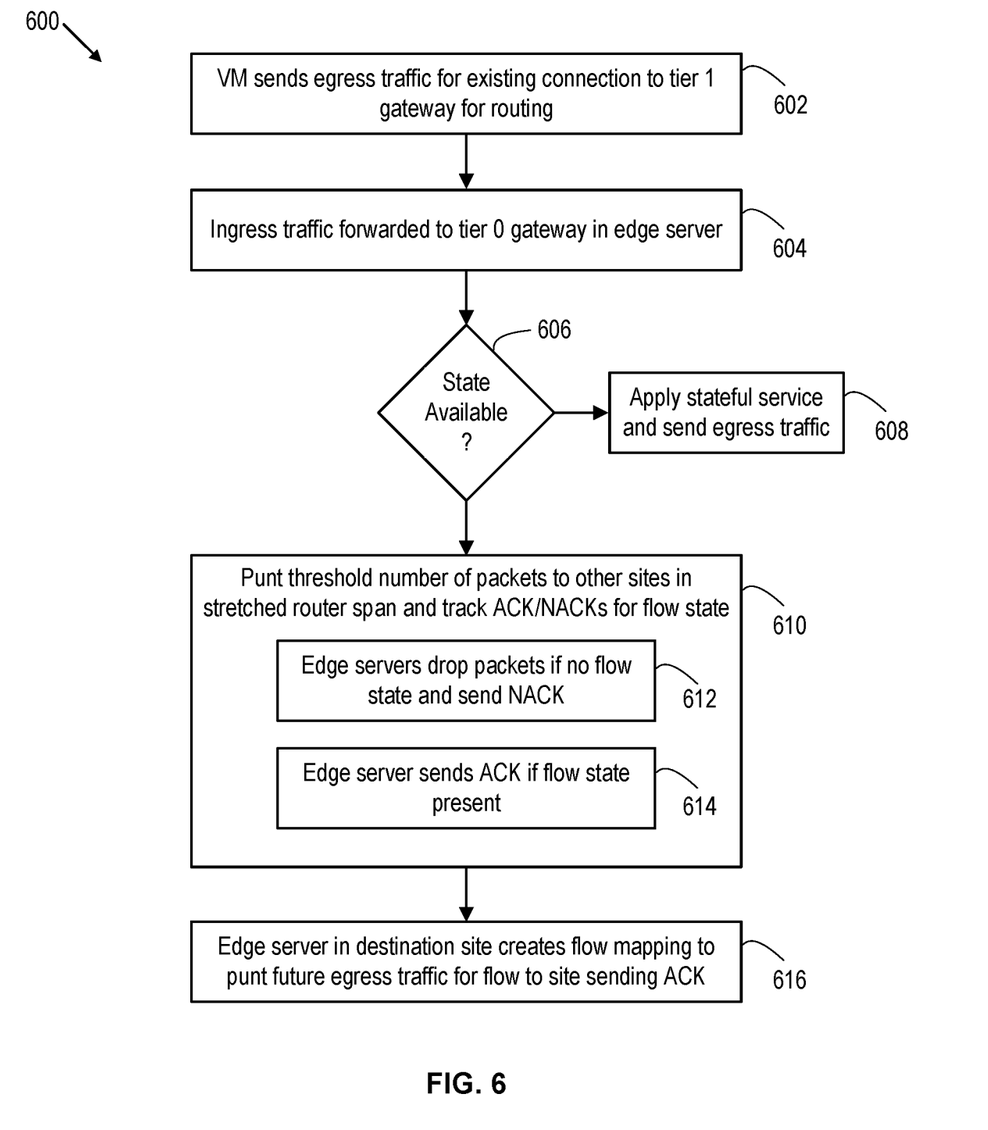
FIG. 6 is a flow diagram depicting a method of handling egress traffic from a migrated VM according to embodiments.

FIG. 6 is a flow diagram depicting a method 600 of handling egress traffic from a migrated VM according to embodiments. Method 600 begins at step 602, where VM 128 sends egress traffic for an existing connection to tier 1 gateway 312. At step 604, tier 1 gateway 312 routes the egress traffic and a VTEP encapsulates and sends the traffic to tier 0 gateway 306. At step 606, tier 0 gateway 306 determines if state is available for the flow. That is, whether stateful service 324 maintains state for the flow associated with the egress traffic. If so, method 600 proceeds to step 608 where stateful service 324 processes the egress traffic and tier 0 gateway 306 sends the egress traffic upstream. State is present in edge server 130 if the existing connection was formed after migration of VM 128.

If at step 606 the state is not available at edge server 130, method 600 proceeds to step 610. At step 610, tier 0 gateway 306 punts a threshold number of packets from the flow to other sites in stretched router span 302. Tier 0 gateway 306 tracks acknowledgments (ACKs) and non-acknowledgements (NACKs) for the flow state by the other sites. Notably, at step 612, edge servers drop the punted packets if no flow state exists for the flow and sends NACKs to tier 0 gateway 306. At step 614, edge server 120 sends an ACK since it has flow state present. Punting involves encapsulating the packets using an L2-over-L3 protocol and sending the packets from the RTEP of edge server 130 to the RTEP of edge server 120. The encapsulated packets are tagged with a virtual network interface (VNI) of tier 0 gateway 304.

At step 616, edge server 130 creates a flow mapping to punt future egress traffic for the flow to edge server 120. In this manner, existing connections of VM 128 continue to function after VM 128 is migrated.

Figure 7:
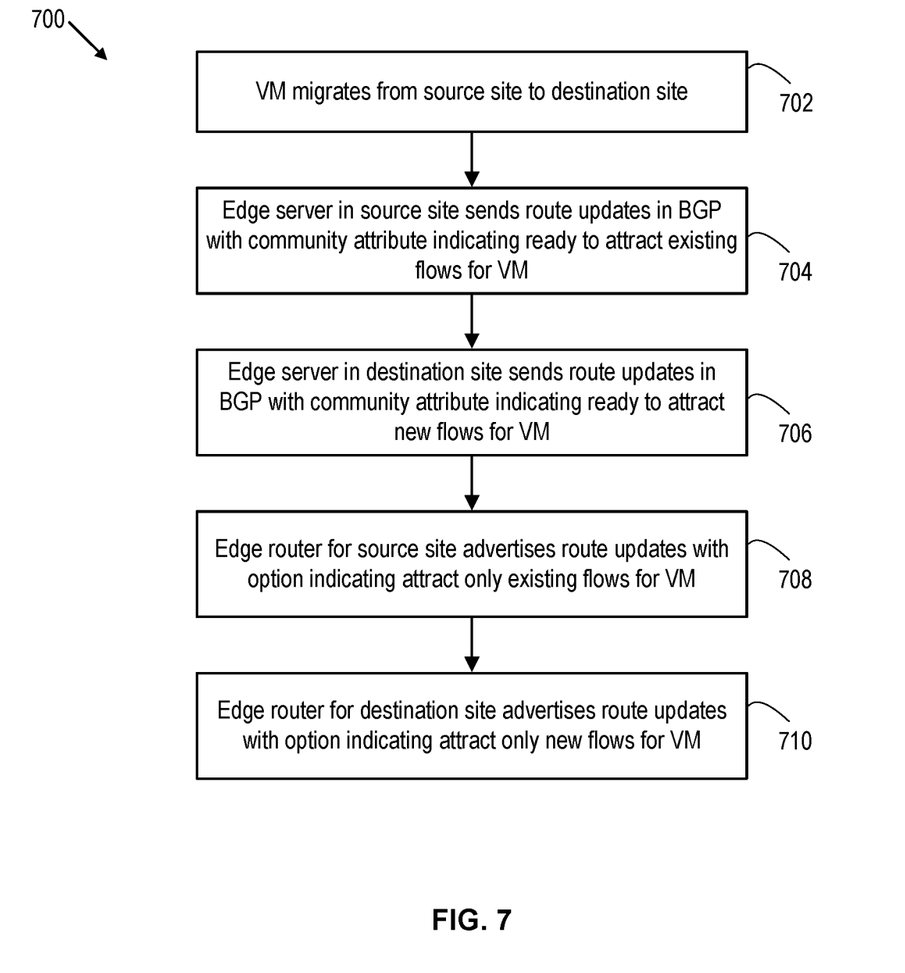
FIG. 7 is a flow diagram depicting a method of attracting ingress traffic for a VM post-migration according to embodiments.

FIG. 7 is a flow diagram depicting a method 700 of attracting ingress traffic for a VM post-migration according to embodiments. In some embodiments, edge routers 108 and 110, as well as router 112, can be configured to maintain flow context for each network flow. Thus, edge router 108 maintains flow contexts 340, edge router 342 maintains flow contexts 342, and router 112 maintains flow contexts 344. Method 700 begins at step 702, where VM 128 migrates from source to destination site (from data center 102 to data center 104). At step 704, edge server 120 sends route updates in border gateway protocol (BGP) with a BGP community attribute indicating ready to attract only existing flows for VM 128. In other embodiments, other routing protocols or other types of messages may be used to communicate the route updates. As discussed above, edge server 120 maintains state for the existing flows for VM 128 prior to migration. Edge router 108 records the route updates in flow contexts 340. At step 706, edge server 130 sends route updates in BGP with BGP community attribute indicating ready to attract only new flows for VM 128. In other embodiments, other routing protocols or other types of messages may be used to communicate the route updates. As discussed above, edge server 130 will maintain state for new flows initiated by or to VM 128 after migration. Edge router 110 records the route updates in flow contexts 342.

Edge router 108 converts the route updates to a type, length, value (TLV) format (e.g., a VeloCloud Routing Protocol (VCRP) format with an option to attract only existing flows. At step 708, edge router 108 advertises the TLV route updates with the option indicating attract only existing flows for VM. Router 112 records the route updates in flow contexts 344. Edge router 110 converts the route updates to a type, length, value (TLV) format (e.g., a VCRP format with an option to attract only new flows). At step 710, edge router 110 advertises the TLV route updates with the option indicating attract only new flows for VM. Router 112 records the route updates in flow contexts 344.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of handling traffic for an existing connection of a virtual machine (VM) migrated from a source site to a destination site, the method comprising:
    receiving, at an edge server of the destination site, the traffic, the traffic being associated with a network flow;
    determining, by the edge server of the destination site, that a stateful service of the edge server does not have state for the network flow;
    sending, by the edge server of the destination site, a threshold number of packets of the traffic to a plurality of sites;
    receiving, at the edge server of the destination site, an acknowledgement from the source site that the source site has the state for the network flow; and
    creating, by the edge server of the destination site, a flow mapping to send the traffic associated with the network flow to the source site.

2. The method of claim 1, wherein the edge server is a first edge server, and wherein the edge server sends the threshold number of packets to a second edge server in the source site.

3. The method of claim 1, wherein the traffic comprises ingress traffic destined for the VM.

4. The method of claim 1, wherein the traffic comprises egress traffic originated from the VM.

5. The method of claim 1, further comprising:
    advertising, by the edge server of the destination site, a specific route to the VM in the destination site; and
    withdrawing, by an edge server of the source site, a specific route to the VM in the source site.

6. The method of claim 1, wherein sites in the plurality of sites other than the source site indicate to the edge server of the destination site absence of the state of the network flow.

7. The method of claim 1, wherein the edge server is a first edge server having a first gateway, wherein the source site includes a second edge server having a second gateway, wherein the first gateway and the second gateway are part of a stretched router span, and wherein the first edge server punts the threshold number of packets over the stretched router span.

8. A non-transitory computer readable medium comprising instructions to be executed in a computing device to cause the computing device to carry out a method of a method of handling traffic for an existing connection of a virtual machine (VM) migrated from a source site to a destination site, the method comprising:
    receiving, at an edge server of the destination site, the traffic, the traffic being associated with a network flow;
    determining, by the edge server of the destination site, that a stateful service of the edge server does not have state for the network flow;
    sending, by the edge server of the destination site, a threshold number of packets of the traffic to a plurality of sites;
    receiving, at the edge server of the destination site, an acknowledgement from the source site that the source site has the state for the network flow; and
    creating, by the edge server of the destination site, a flow mapping to send the traffic associated with the network flow to the source site.

9. The non-transitory computer readable medium of claim 8, wherein the edge server is a first edge server, and wherein the edge server sends the threshold number of packets to a second edge server in the source site.

10. The non-transitory computer readable medium of claim 8, wherein the traffic comprises ingress traffic destined for the VM.

11. The non-transitory computer readable medium of claim 8, wherein the traffic comprises egress traffic originated from the VM.

12. The non-transitory computer readable medium of claim 8, further comprising:
    advertising, by the edge server of the destination site, a specific route to the VM in the destination site; and
    withdrawing, by an edge server of the source site, a specific route to the VM in the source site.

13. The non-transitory computer readable medium of claim 8, wherein sites in the plurality of sites other than the source site indicate to the edge server of the destination site absence of the state of the network flow.

14. The non-transitory computer readable medium of claim 8, wherein the edge server is a first edge server having a first gateway, wherein the source site includes a second edge server having a second gateway, wherein the first gateway and the second gateway are part of a stretched router span, and wherein the first edge server punts the threshold number of packets over the stretched router span.

15. A method of handling traffic for an existing connection and a new connection to a virtual machine (VM) migrated from a source site to a destination site, the method comprising:
    sending, by a first edge server in the source site to a first edge router for the source site, route updates with an indication that the first edge server is ready to attract only the existing connection and not the new connection to the VM;

sending, by the first edge router to an upstream router, route updates with an indication that the first edge router is ready to attract only the existing connection and not the new connection to the VM;

sending, by a second edge server in the destination site to a second edge router for the destination site, route updates with an indicate that the second edge server is ready to attract only the new connection and not the existing connection; and sending, by the second edge router to the upstream router, route updates with an indicate that the second edge router is ready to attract only the new connection and not the existing connection to the VM.

16. The method of claim 15, wherein each of the first and the second edge routers is configured to track flow context, wherein the first edge router stores the route updates from the first edge server in the flow context thereof, and wherein the second edge router stores the route updates from the second edge server in the flow context thereof.

17. The method of claim 16, wherein the upstream router is configured to track flow context, and wherein the upstream router stores the route updates from each of the first edge router and the second edge router in the flow context thereof.

18. The method of claim 15, wherein the first edge server includes a first gateway, wherein the second edge server includes a second gateway, and wherein the first gateway and the second gateway are part of a stretched router span.

19. A computing system, comprising:
a first data center having a first edge server;
a second data center having a second edge server, a first gateway of the first edge server and a second gateway of the second edge server being part of a stretched router span, a virtual machine (VM) executing in the second data center having been migrated from the first data center, the second edge server configured to handle traffic for an existing connection of the VM by:
receiving the traffic, the traffic being associated with a network flow;
determining that a stateful service of the edge server does not have state for the network flow;
sending a threshold number of packets of the traffic to a plurality of sites;
receiving an acknowledgement from the source site that the source site has the state for the network flow; and
creating a flow mapping to send the traffic associated with the network flow to the source site.

20. The computing system of claim 19, wherein sites in the plurality of sites other than the source site indicate to the edge server of the destination site absence of the state of the network flow.

* * * * *